(12) United States Patent
Polynkin et al.

(10) Patent No.: US 6,507,685 B1
(45) Date of Patent: Jan. 14, 2003

(54) METHOD AND APPARATUS FOR SERVO-BASED SPECTRAL ARRAY ALIGNMENT IN OPTICAL SYSTEMS

(75) Inventors: Pavel G. Polynkin, Fremont, CA (US); Jeffrey P. Wilde, Morgan Hill, CA (US)

(73) Assignee: Capella Photonics, Inc., San Jose, CA (US)

( * ) Notice: Subject to any disclaimer, the term of this patent is extended or adjusted under 35 U.S.C. 154(b) by 0 days.

(21) Appl. No.: 09/961,565

(22) Filed: Sep. 20, 2001

(51) Int. Cl.[7] .............. G02B 6/26; G02B 6/28; G02B 6/34; H04J 14/02
(52) U.S. Cl. .............. 385/37; 385/15; 385/52; 359/115; 359/124; 359/130
(58) Field of Search .............. 385/15, 24, 37, 385/52; 359/115, 124, 130

(56) References Cited

U.S. PATENT DOCUMENTS 6,025,939 A * 2/2000 Lowenhar et al. ............ 359/34
6,239,891 B1 * 5/2001 Nakama ..................... 359/131
2002/0131698 A1 * 9/2002 Wilde ......................... 385/31

* cited by examiner

*Primary Examiner*—Brian Healy
*Assistant Examiner*—Kevin S Wood
(74) *Attorney, Agent, or Firm*—Gray, Cary, Ware & Freidenrich

(57) ABSTRACT

This invention provides a novel method and apparatus which use a wavelength-dispersing means such as a diffraction grating to spatially separate a multi-wavelength optical signal along with a reference signal by wavelength into multiple spectral channels and a reference spectral component in a spectral array with a predetermined relative alignment. By aligning the reference spectral component at a predetermined location, the spectral channels simultaneously impinge onto designated locations, e.g., on an array of beam-receiving elements positioned in accordance with the spectral array. The reference spectral component may be further maintained at the predetermined location by way of servo-control, thereby ensuring that the spectral channels stay aligned at the designated locations. The present invention can be used to construct a new line of servo-based optical systems, including spectral power monitors and optical multiplexers/demultiplexers, for WDM optical networking applications.

52 Claims, 10 Drawing Sheets

METHOD AND APPARATUS FOR SERVO-BASED SPECTRAL ARRAY ALIGNMENT IN OPTICAL SYSTEMS

FIELD OF THE INVENTION

This invention relates generally to optical systems. More specifically, it relates to a novel method and apparatus for servo-based spectral array alignment. The present invention can be used to construct a variety of servo-based optical devices including spectral power monitors, multiplexers and demultiplexers, and optical add-drop multiplexers, which are well suited for WDM optical networking applications.

BACKGROUND

As all-optical communication networks become increasingly pervasive, a challenge to optical networking equipment makers is to provide optical components and subsystems that are robust, versatile, and cost-effective.

Contemporary optical communication networks commonly employ wavelength division multiplexing (WDM), for it allows multiple information (or data) channels to be simultaneously transmitted on an optical fiber by using different optical wavelengths, thereby significantly enhancing the information bandwidth of the fiber. The prevalence of WDM imposes a particular need for a line of optical systems that are capable of separating a multi-wavelength optical signal into a spatial array of spectral channels according to wavelength, so that these spectral channels can be separately detected by an array of optical power sensors, as in the case of spectral monitors; directed into an array of input/output ports (e.g., optical fibers), as in the case of optical multiplexers/demultiplexers; or dynamically routed by an array of micromirrors according to a predetermined scheme. In such optical systems, it is essential that the requisite alignment between the spectral channels and the designated beam-receiving devices (i.e., optical power sensors or micromirrors) be maintained over the course of operation, and robust with respect to environmental effects such as thermal and mechanical disturbances.

Conventional optical devices in the art, however, typically employ precision alignment, which dictates stringent fabrication tolerances and painstaking alignment during assembly. Moreover, there are no provisions provided for maintaining the requisite alignment over the course of operation; and no mechanisms implemented for overcoming shift in the alignment due to environmental effects such as thermal and mechanical disturbances. Altogether, these shortcomings render the prior optical devices characteristically high in cost, cumbersome in size and operation, and prone to degradation in performance.

In view of the foregoing, it is desirable and would be a significant advance in the art to provide for a new line of optical devices in which the optical alignment is actively controlled during operation in a simple, robust, and cost-effective construction.

SUMMARY OF THE INVENTION

The present invention provides a method and apparatus for servo-based spectral array alignment in optical systems. The optical apparatus of the present invention comprises an input port, for providing a multi-wavelength optical signal along with a reference signal; a wavelength-disperser for spatially separating the multi-wavelength optical signal and the reference signal by wavelength into multiple spectral channels and a reference spectral component in a spectral array with a predetermined relative arrangement; a beam-receiving array including a reference-wavelength-sensing element and a plurality of beam-receiving elements, positioned such to receive corresponding ones of the reference spectral component and the spectral channels; and a servo-control unit for maintaining the reference spectral component at a predetermined location on the reference-wavelength-sensing element and thereby ensuring a particular alignment between the spectral channels and the beam-receiving elements.

In the present invention, a "spectral channel" is characterized by a distinct center wavelength and associated bandwidth, and may carry a unique information signal as in WDM optical networking applications. A "reference signal" (and the corresponding "reference spectral component") generally refers to any optical signal characterized by a well-defined (and stable) center wavelength that does not substantially overlap with any of the wavelengths of the spectral channels under consideration. Further, the terms "reference signal" (or "reference spectral component") and "calibration signal" (or "calibration spectral component") may be used interchangeably in this specification.

A beam-receiving element in the present invention should be construed broadly as embodying any optical element that corresponds with at least one spectral channel. By way of example, a beam-receiving element may be an optical power sensor, an optical fiber, a micromirror, a focusing lens, or an optical modulator. The beam-receiving elements may be configured to be in a one-to-one correspondence with the spectral channels. The beam-receiving elements may also be configured such that a subset of beam-receiving elements each corresponds with a plurality of the spectral channels.

In the aforementioned optical apparatus of the present invention, the input port may be provided by a fiber collimator coupled to an input optical fiber. In the event that the multi-wavelength optical signal is transmitted by the input optical fiber and the reference signal is provided by a reference light source, an optical combiner (e.g., a fiber-optic fused coupler) may be used to couple the reference light source to the input optical fiber. This provides a simple way of coupling both the multi-wavelength optical signal and the reference signal into the same input port. Alternatively, a particular optical signal (e.g., a service channel in an optical network) may be designated to serve as the reference signal on a network level, as might be in WDM optical networking applications, and transmitted along with various WDM signals through the communication system. The wavelength-disperser may be provided by a diffraction grating, such as a ruled diffraction grating, a holographic diffraction grating, an echelle grating, a transmission grating, a dispersing prism, or other types of wavelength-separating means known in the art. The reference-wavelength-sensing element may be a position sensitive detector, a split detector, or a quadrant detector known in the art, each allowing the impinging position of an optical beam to be monitored by way of the output electric signals produced by the sensing element. The optical apparatus of the present invention may further include a beam-focuser, e.g., one or more focusing lenses, for focusing the spectral channels along with the reference spectral component into corresponding focused spots impinging onto the respective beam-receiving elements.

The employment of a reference signal along with the corresponding reference-wavelength-sensing element allows the present invention to advantageously exploit a servo-control unit for maintaining the requisite alignment between the spectral channels and the beam-receiving elements. The servo-control unit may be in the form of a processing element working in conjunction with an alignment-adjusting element capable of adjusting the alignment of the spectral channels along with the reference spectral component. The processing element serves to monitor the real-time impinging position of the reference spectral component onto the reference-wavelength-sensing element by processing the output signals received from the reference-wavelength-sensing element, and to provide feedback (or servo) control of the alignment-adjusting element accordingly, so as to maintain the reference spectral component at the predetermined location and thereby ensure the requisite alignment between the spectral channels and the respective beam-receiving elements. The alignment-adjusting element may be an appropriate actuation device coupled to the beam-receiving array, for causing the reference-wavelength-sensing element and the beam-receiving elements to move in tandem and thereby adjusting a relative alignment between the spectral array and the underlying beam-receiving array. The alignment-adjusting element may alternatively be a beam-steering device, such as a dynamically adjustable mirror in optical communication with the input port and the wavelength-disperser, for adjusting the alignment of the input multi-wavelength optical signal along with the reference signal. The alignment-adjusting element may also be an actuation device coupled to the wavelength-disperser (e.g., a diffraction grating), for causing the wavelength-disperser to move (e.g., rotate) and thereby adjusting the alignment of the spectral channels along with the reference spectral component. In the event that a focusing lens is employed as a beam-focuser in an optical apparatus of the present invention, the alignment-adjusting element may also be in the form of an appropriate actuation device coupled to the focusing lens, for controlling the impinging positions of the spectral channels along with the reference spectral component onto the beam-receiving array.

Moreover, the optical apparatus of the present invention may employ one or more auxiliary reference signals, along with corresponding auxiliary-reference-wavelength-sensing elements, to complement the aforementioned function of the reference spectral component. Accordingly, the servo-control unit may advantageously make use of a combination of the alignment-adjustment methods as described above to actively control the position as well the pitch of the spectral array, thereby ensuring a more robust alignment between the spectral channels and the respective beam-receiving elements.

As such, the employment of the servo-control unit enables the optical apparatus of the present invention to actively correct for shift in alignment owing to environmental effects such as thermal and mechanical instabilities over the course of operation, and therefore be more robust in performance. An additional benefit of using such a servo-control unit is manifested in relaxed fabrication tolerances and precision during initial assembly, rendering the optical apparatus of the present invention a more adaptable and cost-effective construction.

The present invention further provides a method of performing spectral alignment of a multi-wavelength optical signal. The inventive method entails combining a multi-wavelength optical signal with a reference signal; spatially separating the multi-wavelength optical signal and the reference signal by wavelength into multiple spectral channels and a reference spectral component having a predetermined relative arrangement; impinging the reference spectral component at a predetermined location, such that the spectral channels impinge onto designated locations in accordance with the predetermined relative arrangement; and maintaining the reference spectral component at the predetermined location by way of servo-control, thereby ensuring that the spectral channels stay aligned at the designated locations.

In the aforementioned method of the present invention, the servo-control mechanism may be accomplished by monitoring the real-time impinging position of the reference spectral component and adjusting the alignment of the reference spectral component along with the spectral channels accordingly, so as to maintain the impinging position of the reference spectral component at the predetermined location and the spectral channels at the respective designated locations.

The method of the present invention may further include the step of focusing the spectral channels along with the reference spectral component into corresponding focused spots. It may additionally include the step of optically detecting the spectral channels at the designated locations, so as to provide a power spectrum of the detected spectral channels; the step of re-directing the spectral channels, so as to dynamically route the spectral channels according to a predetermined scheme; or modulating one or more characteristics of the spectral channels.

As such, a new line of servo-based optical systems, including spectral power monitors and optical multiplexers/demultiplexers, can be constructed according to the present invention, to meet the ever-challenging demands of optical networking applications.

The novel features of this invention, as well as the invention itself, will be best understood from the following drawings and detailed description.

DETAILED DESCRIPTION

Figure 1:
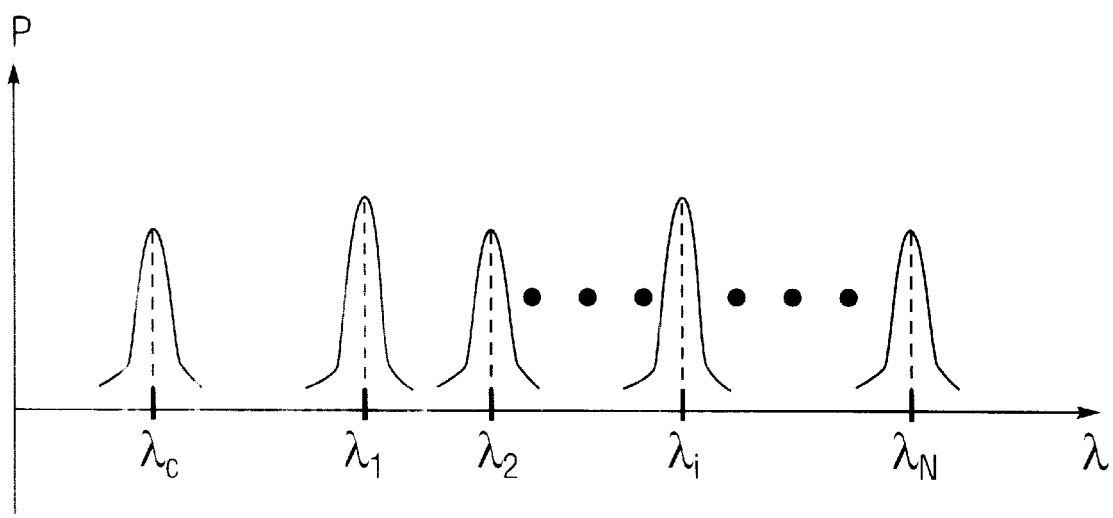
FIG. 1 provides a graphic illustration of an exemplary power spectrum of a reference spectral component and multiple spectral channels, according to the present invention.

FIG. 1 depicts an exemplary power spectrum, i.e., a plot of optical power P as a function of wavelength $\lambda$, of a reference spectral component $\lambda_c$ and multiple spectral channels $\lambda_1$ through $\lambda_N$. In this specification and appending claims, a "spectral channel" is characterized by a distinct center wavelength (e.g., $\lambda_i$) and associated bandwidth, as illustrated in FIG. 1. Each spectral channel may carry a unique information signal, as in WDM optical networking applications. A "reference spectral component" (or "reference signal"), characterized by wavelength $\lambda_c$, generally refers to any optical signal with a well-defined (and stable) center wavelength that does not substantially coincide with any of the wavelengths of the spectral channels under consideration. In FIG. 1, by way of example, the reference spectral component is shown to have a wavelength $\lambda_c$ that is shorter than the wavelengths of the spectral channels. In general, the spectral channels need not be evenly spaced in wavelength (or frequency).

Figure 2A:
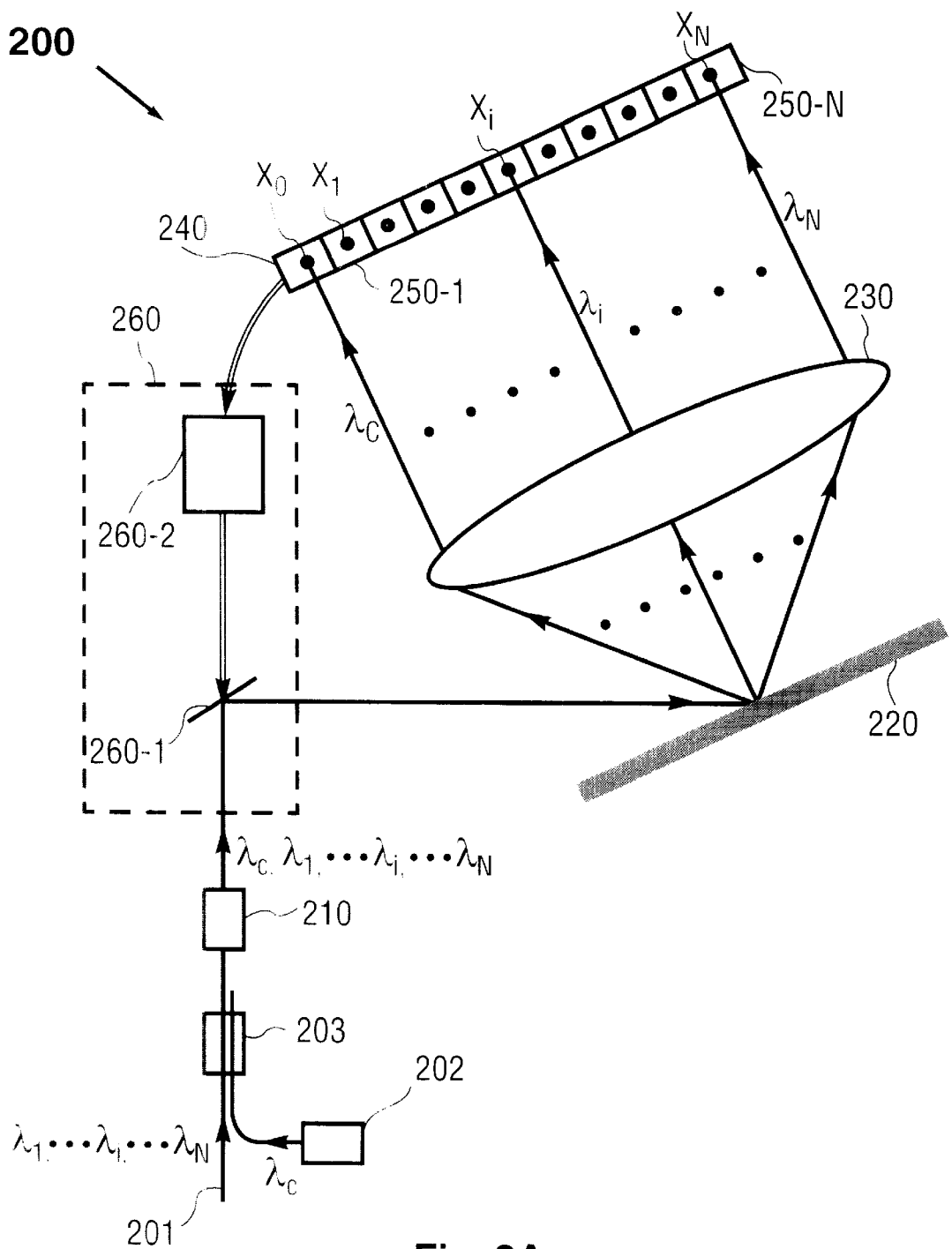
FIGS. 2A–2D depict a first embodiment of an optical apparatus according to the present invention.

FIG. 2A depicts a first embodiment of an optical apparatus according to the present invention. By way of example to illustrate the principles and the general architecture of the present invention, the optical apparatus 200 comprises an input port 210 for a multi-wavelength optical signal which may be in the form of a fiber collimator; an alignment-adjusting element which in one form may be a steering-mirror 260-1, a wavelength-disperser 220 which may be a diffraction grating; a beam-focuser 230 in the form of a focusing lens; and an beam-receiving array including a reference-wavelength-sensing element 240 and a plurality of beam-receiving elements 250-1 through 250-N. In this specification and appending claims, a beam-receiving element is construed broadly as embodying any optical element that receives one or more spectral channels. It may be, for instance, an optical power sensor, a micromirror, an optical fiber, a focusing lens, or an optical modulator, as will be described in more detail later.

The optical apparatus 200 of FIG. 2A may operate as follows. The input port 210 transmits a multi-wavelength optical signal containing wavelengths $\lambda_1$ through $\lambda_N$ along with a reference signal containing wavelength $\lambda_c$. The optical signals are then directed onto the diffraction grating 220 by way of the steering-mirror 260-1. The diffraction grating 220 angularly separates the multi-wavelength optical signal and the reference signal by wavelength into multiple spectral channels $\lambda_1$ through $\lambda_N$ and a reference spectral component $\lambda_c$ having a predetermined relative arrangement. The focusing lens 230 focuses the reference spectral component and the spectral channels into corresponding focused spots, e.g., in a spectral array in accordance with the predetermined relative arrangement. The beam-receiving array containing the reference-wavelength-sensing element 240 and the beam-receiving elements 250-1 through 250-N is positioned such that upon the reference spectral component $\lambda_c$ impinging onto the reference-wavelength-sensing element 240 at a predetermined location $x_o$, the spectral channels $\lambda_1$ through $\lambda_N$ impinge onto the beam-receiving elements 250-1 through 250-N at designated locations $x_1$ through $x_N$ respectively.

It should be noted that the embodiment of FIG. 2A and the following figures are shown in schematic form, for illustrative purpose only. Various elements and optical beams are not drawn to scale. In general, there can be any number of spectral channels in an optical apparatus of the present invention (so long as they are commensurate with the underlying beam-receiving elements). Moreover, the focused spots of the diffracted optical beams impinging onto the beam-receiving array shown in FIG. 2A (and the following figures) may be unevenly spaced.

The optical apparatus 200 of FIG. 2A may further comprise a servo-control unit 260, which in one form may include the steering-mirror 260-1 and a processing element 260-2. The steering-mirror 260-1 dynamically adjusts the alignment of the multi-wavelength optical signal along with the reference signal, thereby controlling the impinging positions of the spectral channels and the reference spectral component onto the beam-receiving array. The processing element 260-2 monitors the real-time impinging position of the reference spectral component $\lambda_c$ on the reference-wavelength-sensing element 240 and provides feedback (or servo) control of the steering-mirror 260-1 accordingly, so as to maintaining the reference spectral component $\lambda_c$ at the predetermined location $x_o$ and therefore the spectral channels $\lambda_1$ through $\lambda_N$ at the designated locations $x_1$ through $x_N$. As such, the servo-control unit 260 enables the optical apparatus of the present invention to actively correct for shift in alignment owing to environmental effects, such as thermal and/or mechanical instabilities over the course of operation, and therefore be more robust in performance. An additional benefit of using such a servo-control unit is manifested in relaxed fabrication tolerances and precision during initial assembly, rendering the optical apparatus of the present invention a more adaptable and cost-effective construction.

Figure 2B:
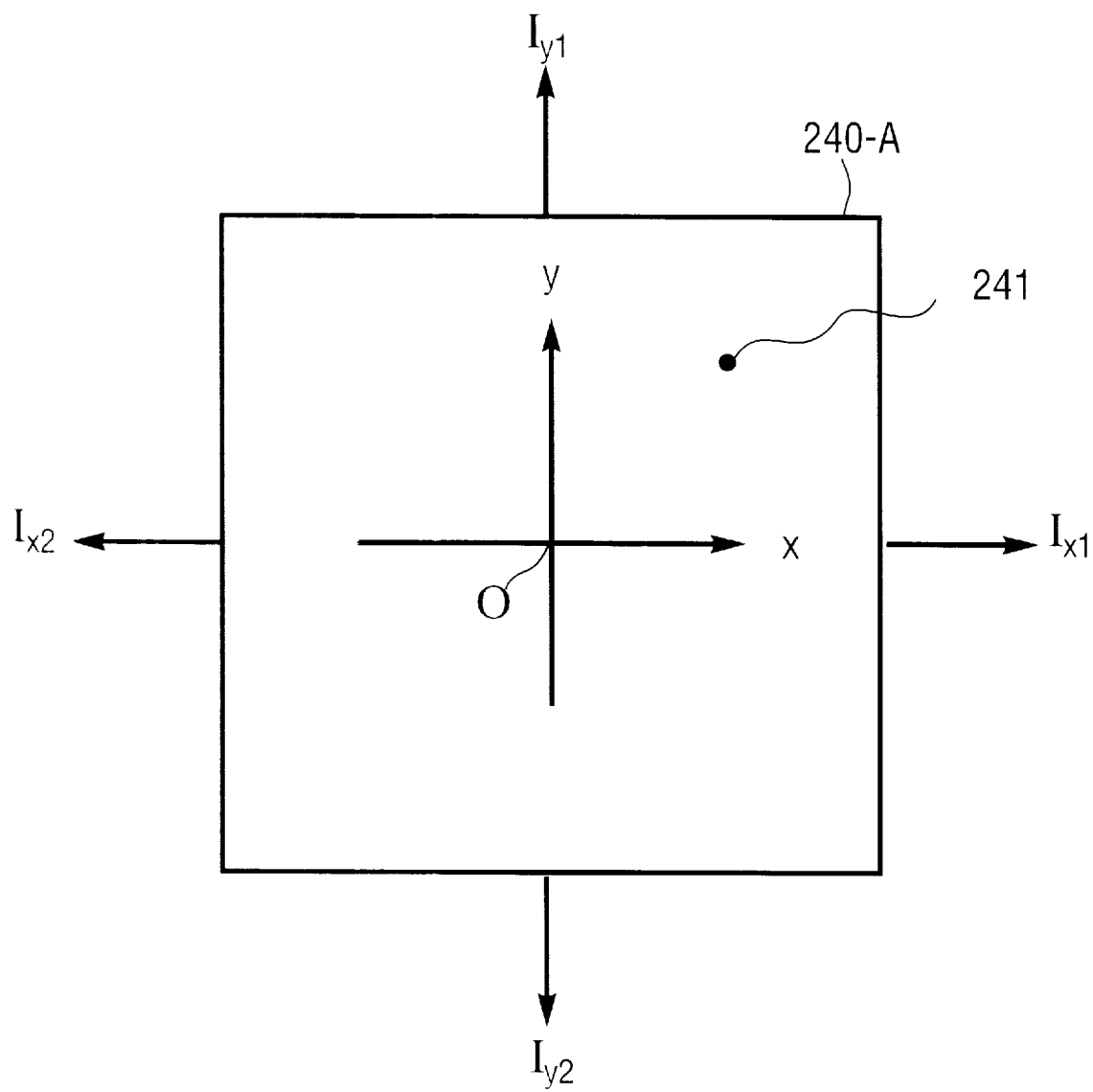

In the above embodiment, the reference-wavelength-sensing element 240 may be a position sensitive detector, a quadrant detector, a split detector, or any other position-sensitive means known in the art, which allows the real-time impinging position (in one or two dimensions) of an optical beam to be monitored by way of electrical (e.g., current or voltage) signals produced by the sensing element. By way of example, FIG. 2B shows a schematic illustration of a position sensitive detector 240-A, upon which an optical beam 241 impinges. The impinging position of the optical beam 241 in the x-direction can be deduced by detecting a pair of output signals, e.g., current signals $I_{x1}$ and $I_{x2}$, whose relative magnitudes provide a measure of the beam spot in the x-direction. Likewise, the impinging position of the optical beam 241 in the y-direction can be obtained by measuring another pair of current signals $I_{y1}$ and $I_{y2}$. Moreover, the deviation of the real-time impinging position of the optical beam 241 from a designated location, e.g., the center point O on the position sensitive detector 240-A, may be monitored by detecting the output signals in an appropriate normalized differential detection scheme (e.g., by measuring $(I_{x1}-I_{x2})/(I_{x1}+I_{x2})$ and/or $(I_{y1}-I_{y2})/(I_{y1}+I_{y2})$), as commonly practiced in the art. Those skilled in the art will also know how to make use of other types of position-sensitive means known in the art to provide for a reference-wavelength-sensing element in the present invention.

The steering-mirror 260-1 of FIG. 2A may be a dynamically adjustable mirror that is rotatable about one or two axes. For instance, it may be a silicon micromachined mirror with an appropriate actuation mechanism; it may also be provided by coupling an actuation device known in the art to a mirror or beam-deflecting element. The processing element 260-2 of FIG. 2A may include electrical circuits, controllers and signal processing programs for processing the output signals received from the reference-wavelength-sensing element 240 (e.g., the current signals from the position sensitive detector 240-A of FIG. 2B) and deriving from the detected signals the real-time impinging position of the reference spectral component $\lambda_c$. The processing element 260-2 accordingly generates appropriate control signals to be applied to the alignment-adjusting element, e.g., the steering-mirror 260-1 of FIG. 2A, so as to adjust the alignment of the reference spectral component along with the spectral channels in such a way that the reference spectral component $\lambda_c$ is maintained at the predetermined location $x_o$. The electronic circuitry and the associated signal processing algorithm/software for a processing element in a servo-control system are known in the art of electrical engineering and servo control systems.

Figure 2C:
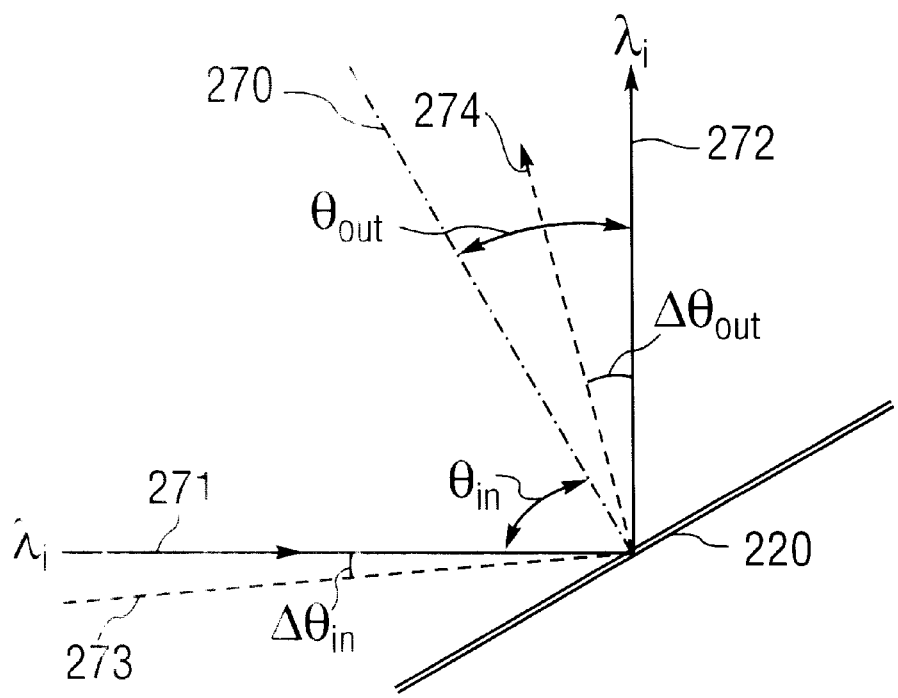
Figure 2D:
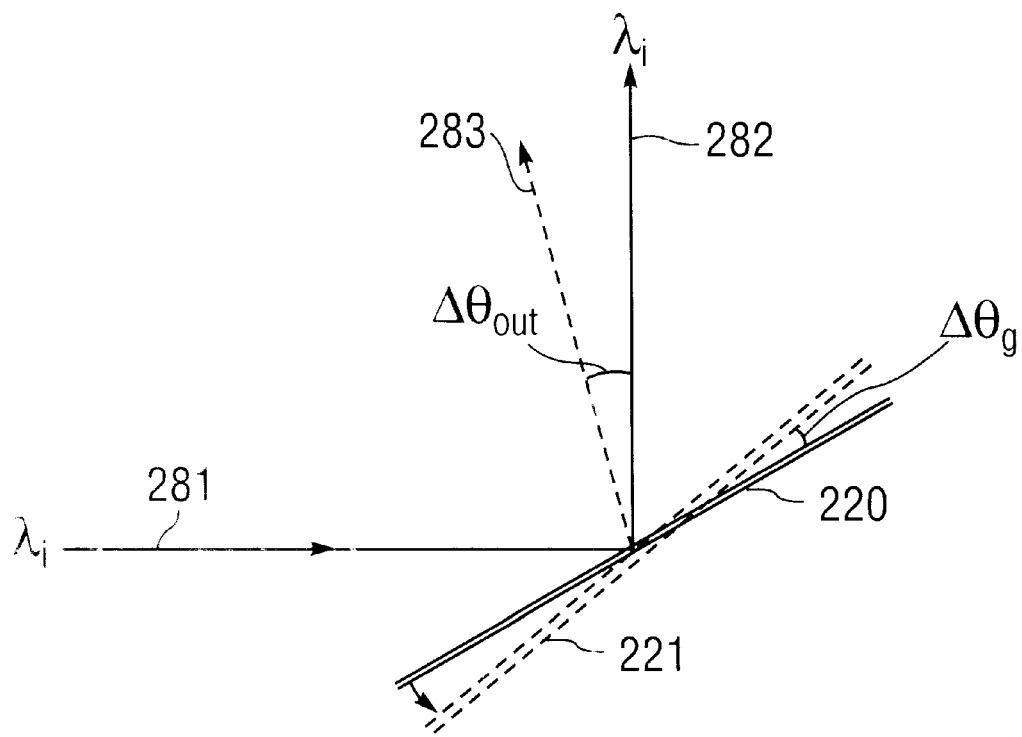

FIGS. 2C–2D depict two exemplary ways of adjusting the alignment of optical beams in the embodiment of FIG. 2A. In FIG. 2C, a first optical beam 271 containing wavelength $\lambda_i$ (which may represent a spectral channel) is incident onto the diffraction grating 220 at an incidence angle $\theta_{in}$, and is diffracted from the diffraction grating 220 as a first diffracted beam 272 at a diffraction angle $\theta_{out}$, as determined by the grating equation:

$$\sin\theta_{in} + \sin\theta_{out} = m\frac{\lambda}{d} \quad (1)$$

where m is the diffraction order and d is the grating pitch (i.e., the spacing between two adjacent groove lines on the grating). Both $\theta_{in}$ and $\theta_{out}$ are measured with respect to the normal axis 270 of the diffraction grating 220. If the incidence angle of the optical beam upon the diffraction grating 220 is varied by $\Delta\theta_{in}$, as indicated by a second optical beam 273, the diffraction angle of the diffracted beam changes correspondingly by $\Delta\theta_{out}$, as indicated by a second diffracted beam 274. Hence, varying the incidence angle of the multi-wavelength optical signal along with the reference signal upon the diffraction grating 220, e.g., by action of the steering-mirror 260-1 in FIG. 2A, causes the diffraction angles of the spectral channels and the reference spectral component to change correspondingly, thereby enabling the reference spectral component $\lambda_c$ to impinge at the predetermined location $x_o$ and the spectral channels $\lambda_1$ through $\lambda_N$ at the designated locations $x_1$ through $x_N$.

Instead of (or in conjunction with) varying the incidence angle of the optical beams upon the diffraction grating 220 (e.g., by way of the steering-mirror 260-1 in FIG. 2A), the diffraction grating 220 itself may be rotated, thereby performing a similar alignment function, as illustrated in FIG. 2D. In this case, a first optical beam 281 containing wavelength $\lambda_i$ is incident onto the diffraction grating 220, and is diffracted from the diffraction grating 220 as a first diffracted beam 282. Rotating the diffraction grating 220 by an angle $\Delta\theta_g$, as indicated by the thus-rotated diffraction grating 221, effectively changes the diffraction angle by $\Delta\theta_{out}$, as indicated by a second diffracted beam 283. The rotation of the diffraction grating may be accomplished by coupling to the grating an appropriate actuation device, such as a voice coil actuator, a stepping motor, a solenoid actuator, a piezoelectric actuator, or other types of actuation means known in the art. The actuation device may in turn be controlled by the processing element in a servo-control unit.

In the embodiment of FIG. 2A, the angular dispersion D of the diffraction grating 220 can be derived from the grating equation in Eq. (1):

$$D = \frac{\partial\theta_{out}}{\partial\lambda} = \frac{m}{d\cos\theta_{out}} \quad (2)$$

Let the focal length of the focusing lens 230 be f. The pitch P—namely, the spacing between any two adjacent spectral spots—of the spectral array formed by the diffracted optical beams can be expressed as $$P = f\Delta\lambda\frac{\partial\theta_{out}}{\partial\lambda} = \frac{f\Delta\lambda m}{d}\frac{1}{\cos\theta_{out}} \quad (3)$$

where $\Delta\lambda$ is the wavelength difference between two adjacent spectral channels. Eq. (3) shows that the pitch of the spectral array generally varies with the diffraction angle $\theta_{out}$, unless $\theta_{out}$ is zero. The rate of change in P with respect to $\theta_{out}$ can be shown to be $$\frac{\partial P}{\partial\theta_{out}} = \frac{f\Delta\lambda m}{d}\frac{\sin\theta_{out}}{\cos^2\theta_{out}} \quad (4)$$

In FIG. 2C or 2D described above, since the alignment adjustment is brought about by varying the incidence angle $\theta_{in}$ and therefore the diffraction angle $\theta_{out}$, Eq. (3) indicates that the pitch of the spectral array may vary as the alignment adjustment takes place, particularly at large values of the diffraction angle $\theta_{out}$. Hence, in the embodiment of FIG. 2A (where the alignment-adjusting method shown in FIG. 2C or 2D may be implemented), the constituent beam-receiving elements should be configured such that they can accommodate variations in the pitch of the spectral array. (For example, the sizes of the beam-receiving elements may be such that the variations in the pitch of the spectral array do not substantially alter the correspondence between the spectral channels and the respective beam-receiving elements substantially, and are therefore inconsequential in practice.) The embodiment of FIG. 2A may also be desired in applications where the aforementioned change in the pitch of the spectral array is so small (e.g., in the event that the diffraction angle $\theta_{out}$ is close to zero) that it is inconsequential practically.

Instead of performing alignment adjustment by varying the incidence angle of the input multi-wavelength optical signal along with the reference signal, as exemplified in FIG. 2C or 2D, the reference-wavelength-sensing element 240 along with the beam-receiving elements 250-1 through 250-N in FIG. 2A may be moved in tandem, e.g., by translating and/or rotating the beam-receiving array as a whole, so as to enable the reference spectral component along with the spectral channels to impinge at the designated locations. Alternatively, the focusing lens 230 in the embodiment of FIG. 2A may be moved, e.g., shifted or translated, so as to control the impinging locations of the diffracted optical beams.

Figure 3A:
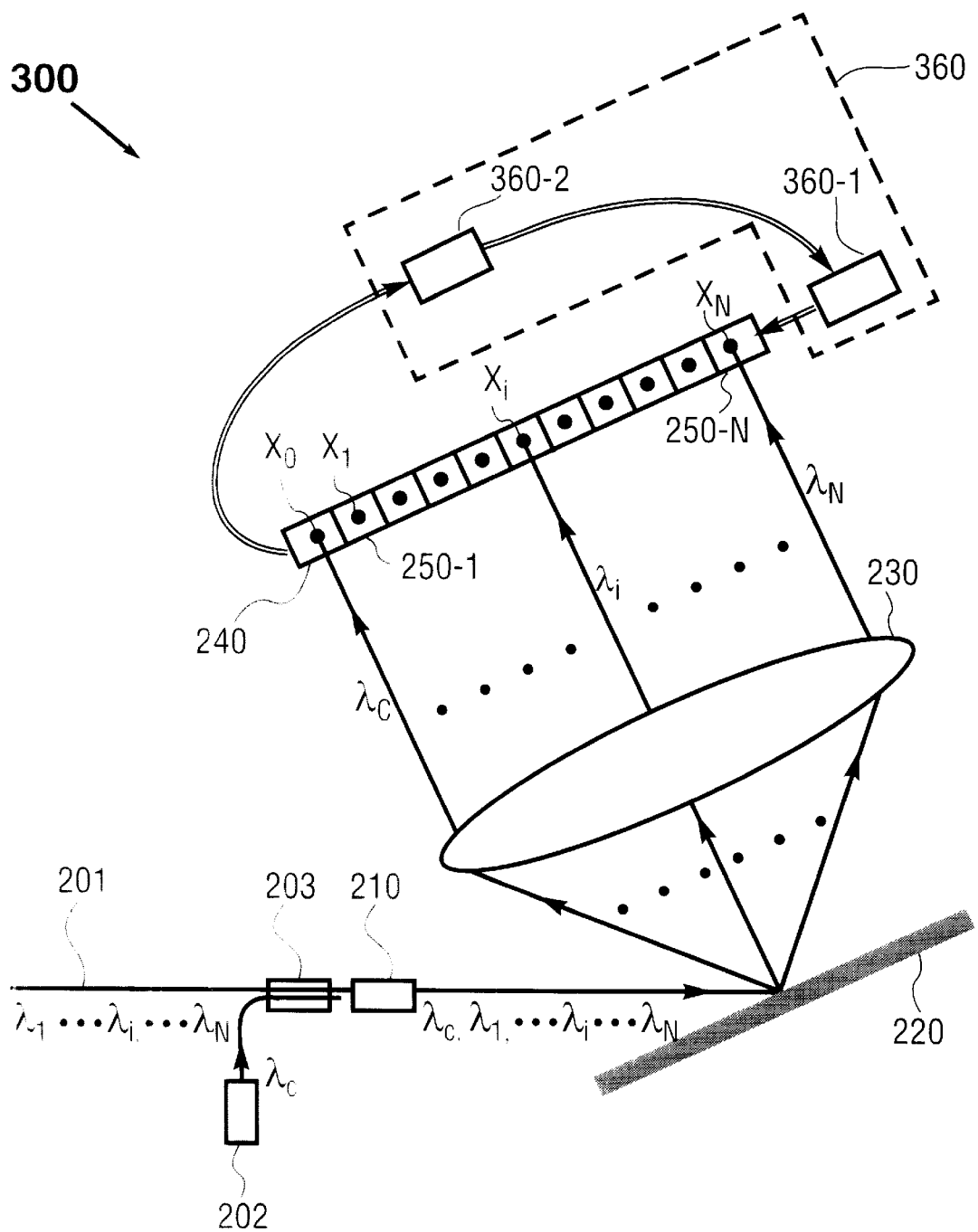
FIGS. 3A–3B show second and third embodiments of an optical apparatus according to the present invention.

FIG. 3A shows a second embodiment of an optical apparatus of the present invention. By way of example, optical apparatus 300 makes use of the architecture as well as many of the elements employed in the embodiment of FIG. 2A, as indicated by those labeled with identical numerals. In this case, the beam-receiving array containing the reference-wavelength-sensing element 240 and the beam-receiving elements 250-1 through 250-N may be integrated into a single structure, e.g., by mounting or fabricating the constituent elements on a substrate, for the ease of operation. Servo-control unit 360 may include an alignment-adjusting element 360-1 which may be a linear actuation device coupled to the beam-receiving array, and a processing element 360-2. The actuation device 360-1 is configured such to cause the beam-receiving array as a whole—therefore the reference-wavelength-sensing element 240 along with the beam-receiving elements 250-1 through 250-N in tandem—to move, e.g., translate along a direction that is substantially transverse to the direction of propagation of the impinging optical beams, thereby adjusting the relative alignment between the spectral array formed by the diffracted optical beams and the underlying beam-receiving array. As in the embodiment of FIG. 2A, the processing element 360-2 serves to monitor the real-time impinging position of the reference spectral component $\lambda_c$ on the reference-wavelength-sensing element 240 and provides servo control of the actuation device 360-1 accordingly, so as to maintain the reference spectral component $\lambda_c$ at the predetermined location $x_o$ and the spectral channels $\lambda_1$ through $\lambda_N$ at the respective designated locations $x_1$ through $x_N$.

Figure 3B:
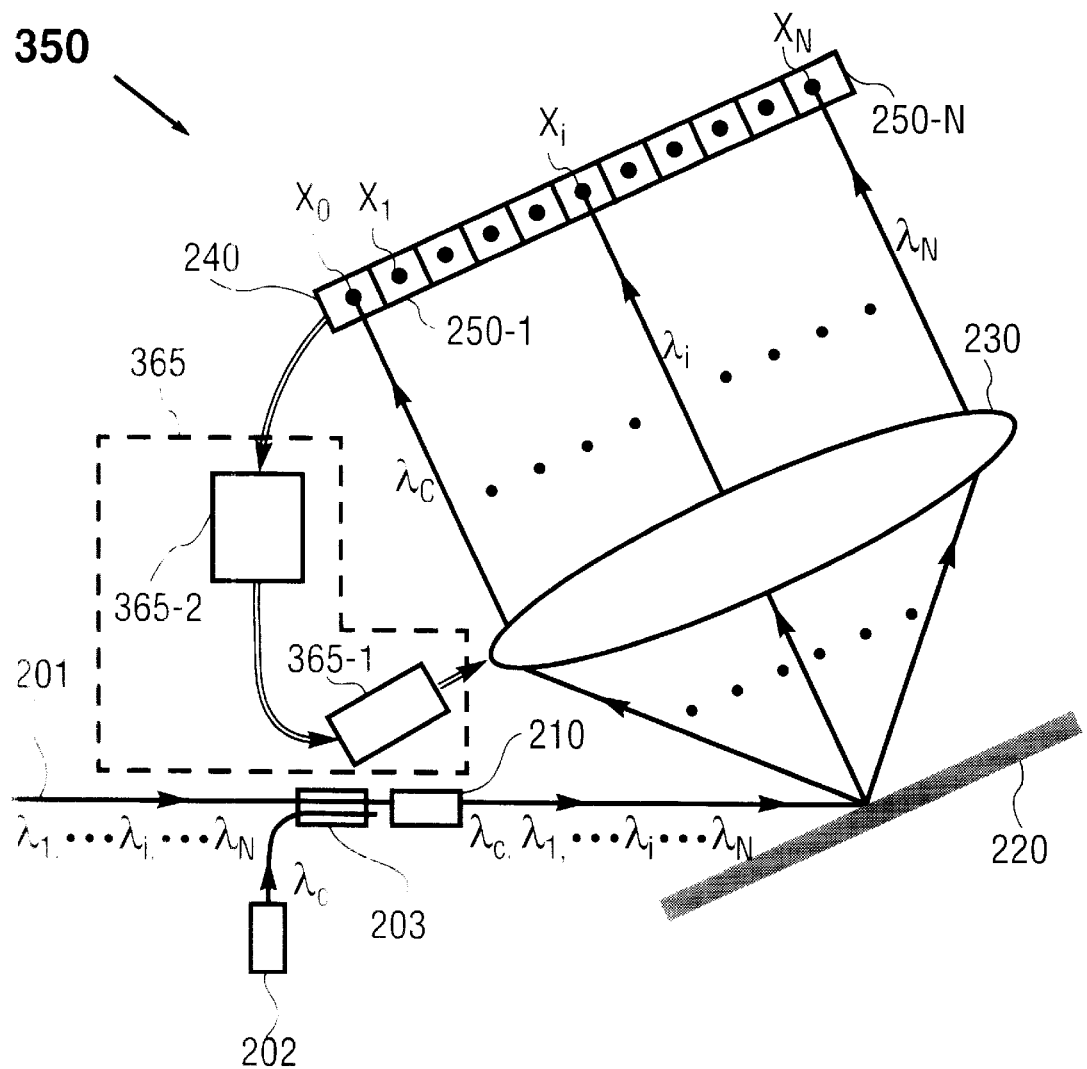

FIG. 3B shows a third embodiment of an optical apparatus of the present invention. By way of example, optical apparatus 350 makes use of the architecture as well as many of the elements employed in the embodiment of FIG. 3A, as indicated by those labeled with identical numerals. An alternative servo-control unit 365, including an alignment-adjusting element 365-1 in the form of an actuation device coupled to the focusing lens 230 and a processing element 365-2, may be implemented. The actuation device 365-1 causes the focusing lens 230 to move, e.g., shift, rotate, or translate, thereby controlling the impinging locations of the diffracted optical beams on the reference-wavelength-sensing element 240 and the beam-receiving elements 250-1 through 250-N, respectively. As in the case of the embodiment of FIG. 3A, the processing element 365-2 monitors the real-time impinging position of the reference spectral component $\lambda_c$ on the reference-wavelength-sensing element 240 and provides servo control of the actuation device 365-1 accordingly, thereby maintaining the reference spectral component $\lambda_c$ at the predetermined location $x_o$ and the spectral channels $\lambda_1$ through $\lambda_N$ at the respective designated locations $x_1$ through $x_N$.

The actuation device 360-1 in the embodiment of FIG. 3A, or the actuation device 365-1 in the embodiment of FIG. 3B, may be a stepping motor, a solenoid actuator, a piezoelectric actuator, a voice coil actuator, or other types of actuation means known in the art. The processing element 360-2 of FIG. 3A, or the processing element 365-2 of FIG. 3B, may be substantially similar to the processing 260-2 of FIG. 2A in configuration and operation. An advantage of the embodiment of FIG. 3A or 3B is evident in that the underlying alignment-adjustment method does not substantially alter the pitch of the spectral array—that is, only the relative alignment between the spectral array and the beam-receive array is adjusted. It should be appreciated that care should be taken in designing the focusing lens 230 in the embodiment of FIG. 3B, such that aberrations and other imperfections are substantially eliminated. As will be appreciated from the teachings of this specification, one skilled in the art would know how to devise an appropriate alignment-adjusting method along with corresponding servo-control system according to the present invention, to suit a given application.

In the embodiment of FIG. 2A, 3A, or 3B, the multi-wavelength optical signal containing wavelengths $\lambda_1$ through $\lambda_N$ may be provided by an input optical fiber 201 coupled to the fiber collimator that serves as the input port 210, and the reference signal $\lambda_c$ may be provided by a reference light source 202. An optical combiner 203, which in one form may be a fiber-optic fused coupler, may be used to couple the reference light source 202 to the input optical fiber 201, such that both the multi-wavelength optical signal and the reference signal are directed into the input port 210. The optical apparatus 200 thus has an independent, internally generated reference light source. Alternatively, the multi-wavelength optical signal itself may include a spectral component (e.g., a service channel in an optical network) that can serve as the reference signal, as in WDM optical networking applications. In such a scenario, the internal reference light source 202 along with the fiber-optic coupler 203 need not be implemented.

Figure 4A:
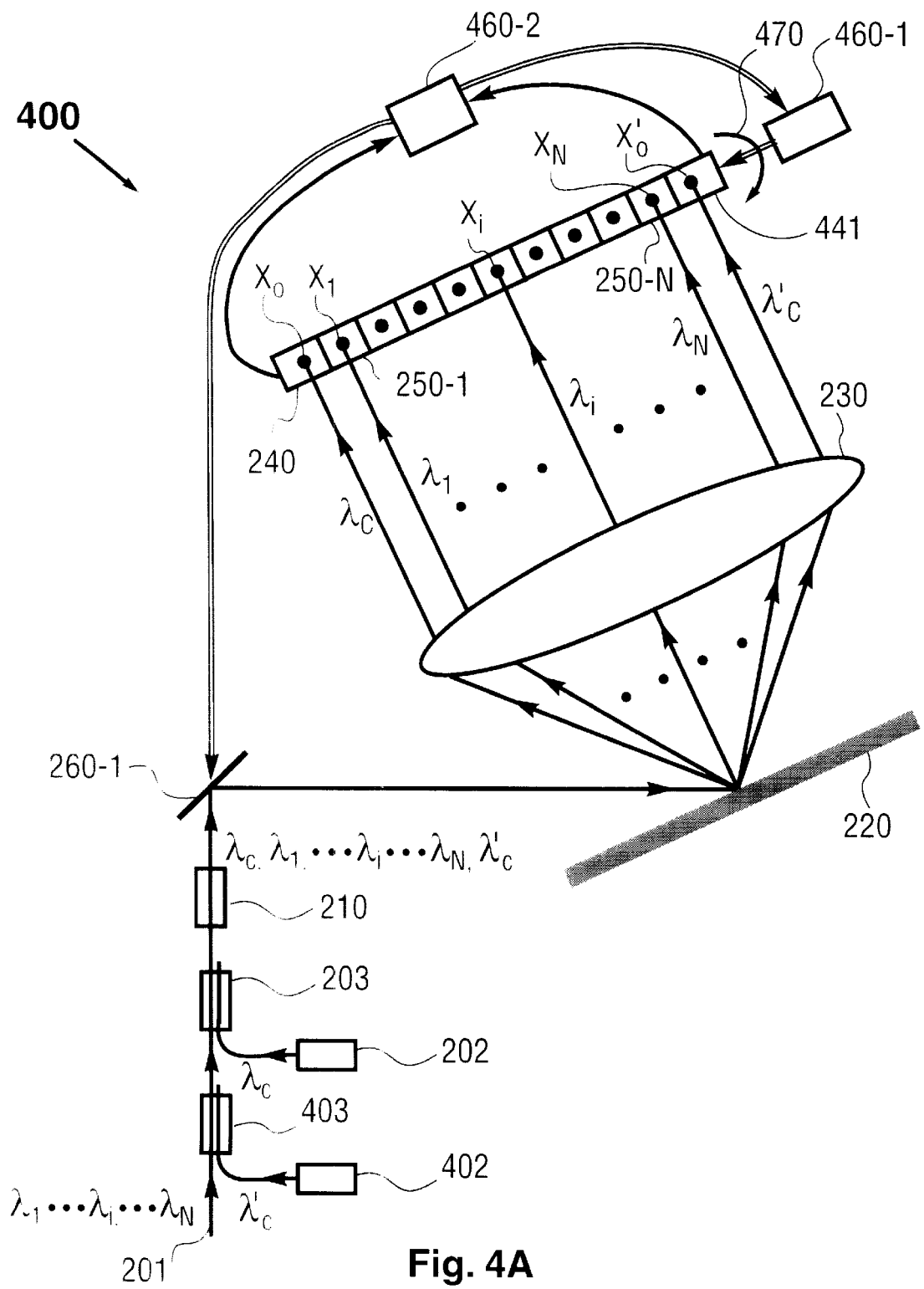
FIGS. 4A–4C depict a fourth embodiment of an optical apparatus according to the present invention.

In the present invention, one or more auxiliary reference signals, along with corresponding reference-wavelength-sensing elements, may be additionally employed to complement the aforementioned function of the reference spectral component $\lambda_c$. FIG. 4A depicts a fourth embodiment of an optical apparatus of the present invention. By way of example, optical apparatus 400 makes use of the architectures as well as a number of the elements used in the embodiments of FIGS. 2A and 3A, as indicated by those labeled with identical numerals. In addition, an auxiliary reference light source 402 may be coupled to the input optical fiber 201 by way of an auxiliary optical combiner 403 which may be a fiber-optic coupler, so as to couple an auxiliary reference signal containing wavelength $\lambda_c'$ to the input port 210. The auxiliary reference signal $\lambda_c'$, along with the multi-wavelength optical signal and the reference signal $\lambda_c$, may then be directed onto the diffraction grating 220 by way of the steering-mirror 260-1. The wavelength $\lambda_c'$ of the auxiliary reference signal may be selected to be longer than the wavelengths of the spectral channels such that upon diffraction, the auxiliary reference signal $\lambda_c'$ impinges onto an auxiliary-reference-wavelength-sensing element 441 at a prescribed location $x_o'$. As such, the reference spectral component $\lambda_c$, the spectral channels $\lambda_1$ through $\lambda_N$, and the auxiliary reference signal $\lambda_c'$ form a spectral array with a predetermined relative arrangement. Accordingly, the reference-wavelength-sensing element 240, the beam-receiving elements 250-1 through 250-N, and the auxiliary-reference-wavelength-sensing element 441 form a beam-receiving array, configured such to receive the spectral array. The beam-receiving array may be integrated into a single structure, e.g., by mounting or fabricating the constituent elements on a substrate.

The auxiliary-reference-wavelength-sensing element 441 may be a position sensitive detector, a split detector, a quadrant detector, or other types of position-sensitive means known in the art. It should be appreciated by one skilled in the art that the aforementioned reference signal and auxiliary reference signal may also be termed first and second reference signals; and the reference-wavelength-sensing element and the auxiliary-reference-wavelength-sensing element may be termed first and second reference-wavelength-sensing elements, accordingly. Moreover, the wavelength-disperser, such as the diffraction grating 220, may direct a (first) reference spectral component $\lambda_c$ in the first reference signal and a (second) reference spectral component $\lambda_c'$ in the second reference signal onto the first and second reference-wavelength-sensing elements at first and second predetermined locations, respectively.

The embodiment of FIG. 4A may further include an actuation device 460-1 and a processing element 460-2. By way of example, the actuation device 460-1 may be coupled to the aforementioned beam-receiving array, so as to cause the beam-receiving array as a whole—therefore the reference-wavelength-sensing element 240 along with the beam-receiving elements 250-1 through 250-N and the auxiliary-reference-wavelength-sensing element 441 in tandem—to move, e.g., translate along a direction substantially transverse to the direction of propagation of the spectral channels, and/or rotate as indicated by a curved arrow 470. For instance, the actuation device 460-1 may cause the beam-receiving array to rotate about a pivotal point positioned at the predetermined location $x_o$. As such, the actuation device 460-1 may be utilized primarily for adjusting the relative alignment between the spectral array formed by the diffracted optical beams and the underlying beam-receiving array. The processing element 460-2 may monitor the real-time impinging position of the reference spectral component $\lambda_c$ on the reference-wavelength-sensing element 240 and provide servo control of the actuation device 460-1 accordingly, so as to maintain the reference spectral component $\lambda_c$ at the predetermined location $x_o$ and the spectral channels $\lambda_1$ through $\lambda_N$ at the respective designated locations $x_1$ through $x_N$.

Figure 4B:
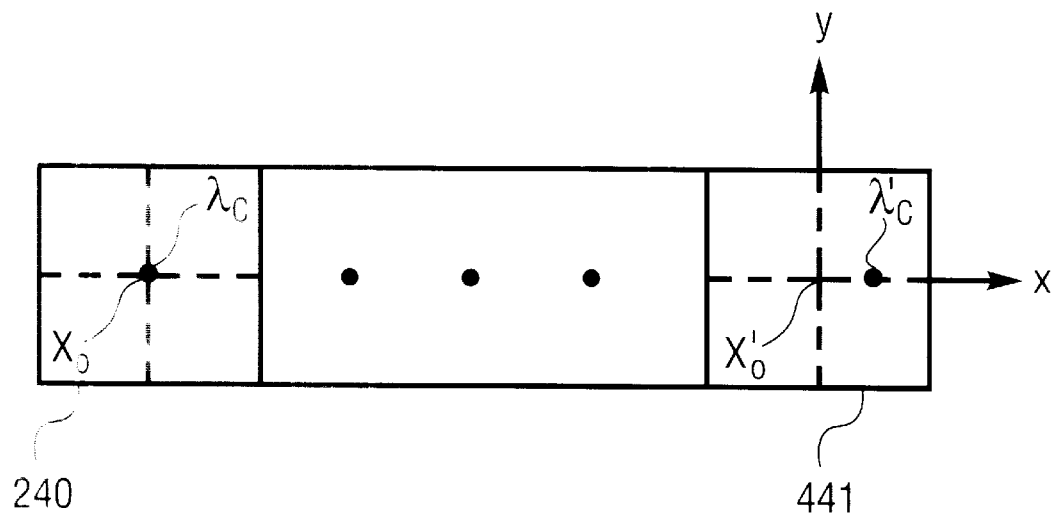

The processing element 460-2 may additionally monitor the real-time impinging position of the auxiliary reference signal $\lambda_c'$ on the auxiliary-reference-wavelength-sensing element 441. Such information might be useful for monitoring misalignment between the spectral channels and the respective beam-receiving elements that may not be reflected by the impinging position of the reference spectral component $\lambda_c$. By way of example, FIG. 4B illustrates a situation where the reference spectral component $\lambda_c$ remains at the predetermined location $x_o$, whereas the impinging position of the auxiliary reference signal $\lambda_c'$ on the auxiliary-reference-wavelength-sensing element 441 is deviated along the x-direction from the prescribed location $x_o'$, which may result from a change in the pitch of the spectral array. The x-y plane in this figure (as well as in FIG. 4C) is shown to be substantially transverse to the direction of propagation of the spectral channels. As indicated in the above discussion, the pitch of the spectral array generally varies with the diffraction angle and therefore the incidence angle of the optical signals upon the diffraction grating (e.g., see Eqs. (3) and (4) above). Accordingly, the processing element 460-2 may use the detected deviation of the auxiliary reference signal $\lambda_c'$ from the prescribed location $x_o'$ to control the steering-mirror 260-1 in a manner effective to bring the auxiliary reference signal $\lambda_c'$ back to the prescribed location $x_o'$, e.g., by adjusting the incidence angle of the input multi-wavelength optical signal along with the reference signal and the auxiliary reference signal on the diffraction grating 220 in a manner similar to the alignment-adjusting method described in FIG. 2C. The alignment of the reference spectral component $\lambda_c$ and the auxiliary reference signal $\lambda_c'$ at the respective locations $x_o$, $x_o'$ are indicative of the requisite alignment between the spectral channels and the respective beam-receiving elements.

Figure 4C:
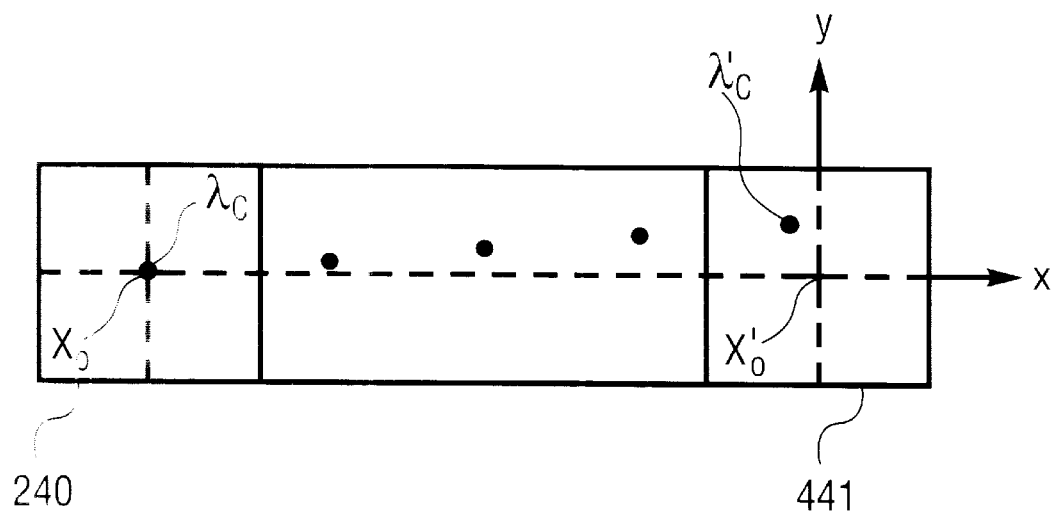

By way of example, FIG. 4C illustrates another situation where the reference spectral component $\lambda_c$ remains at the predetermined location $x_o$, whereas the impinging position of the auxiliary reference signal $\lambda_c'$ on the auxiliary-reference-wavelength-sensing element 441 is deviated from the prescribed location $x_o'$ as indicated, which may be brought about by a rotational motion of the beam-receiving array relative to the spectral array (or vice versa). Accordingly, the processing element 460-2 may use the detected deviation of the auxiliary reference signal $\lambda_c'$ from the prescribed location $x_o'$ to control the actuation device 460-1 in a manner effective to bring the auxiliary reference signal $\lambda_c'$ back to the prescribed location $x_o'$, e.g., by rotating the beam-receiving array relative to the spectral array, thereby restoring the requisite alignment between the spectral channels and the respective beam-receiving elements.

Those skilled in the art will appreciate that the embodiments of FIGS. 4B–4C are provided as a way of example to elucidate the general principles of the present invention. In a practical situation, a deviation of the auxiliary reference signal $\lambda_c'$ from the prescribed location may be due to a number of effects, e.g., a combination of change in the pitch of the spectral array and rotational motion of the beam-receiving array (relative to the spectral array). Accordingly, the processing element 460-2 may control both the actuation device 460-1 and the steering-mirror 260-1 in a coordinated fashion, in order to bring the auxiliary reference signal $\lambda_c'$ back to the designated location, while maintaining the reference spectral component $\lambda_c$ at the predetermined location $x_o$, thereby restoring the requisite alignment between the spectral channels and the beam-receiving elements. Moreover, the control of the pitch of the spectral array may be accomplished by the alignment-adjusting method described in the embodiment of FIG. 2D, in lieu of (or in conjunction with) the function of the steering-mirror 260-1. The relative alignment between the spectral array and the underlying beam-receiving array may be adjusted by coupling an appropriate actuation device to the focusing lens 230 as described in the embodiment of FIG. 3B, in lieu of (or in conjunction with) the alignment function provided by the actuation device 460-1. Additionally, the impinging position of the auxiliary reference signal $\lambda_c'$ may be maintained at the prescribed location by way of servo control, whereas the impinging position of the reference spectral component $\lambda_c$ is being monitored periodically or continuously; or the impinging positions of both the reference spectral component and the auxiliary reference signal may be actively controlled according to an appropriate signal processing and servo-control scheme.

In the embodiment of FIG. 4A, the servo-control unit may generally comprise a first alignment-adjusting element (e.g., the actuation device 460-1, or an appropriate actuation device coupled to the focusing lens 230) for adjusting a relative alignment between the spectral array formed by the diffracted optical beams and the underlying beam-receiving array; a second alignment-adjusting element (e.g., the steering-mirror 260-1, or an appropriate actuation device coupled to the diffraction grating 220) for controlling the pitch of the spectral array; and a processing element (e.g., the processing element 460-2) in communication with the first and second alignment-adjusting elements, as well as the reference-wavelength-sensing element 240 and the auxiliary-reference-wavelength-sensing element 441. The processing element 460-2 may monitor the impinging positions of the reference spectral component $\lambda_c$ and the auxiliary reference signal $\lambda_c'$ onto the reference-wavelength-sensing element 240 and the auxiliary-reference-wavelength-sensing element 441, respectively, and provide control of the first and second alignment-adjusting elements accordingly, so as to maintain the reference spectral component $\lambda_c$ and the auxiliary reference signal $\lambda_c'$ at their respective designated locations, and thereby ensure the requisite alignment between the spectral channels and the respective beam-receiving elements.

As such, the optical apparatus of FIG. 4A advantageously makes use of a combination of appropriate alignment-adjustment methods to actively control the position as well the pitch of the spectral array, therefore being more robust in performance.

In general, one or more auxiliary reference signals in the present invention may be any optical signals with well-defined (and stable) center wavelengths that do not substantially coincide with any of the wavelengths of the spectral channels and the reference spectral component $\lambda_c$. In the embodiment of FIG. 4A, by way of example, the wavelength $\lambda_c'$ of the auxiliary reference signal is shown to be longer than the wavelengths of the spectral channels, whereas the wavelength $\lambda_c$ of the reference spectral component is shorter than the wavelengths of the spectral channels, and both the reference signals are provided by the internal reference light sources as shown. It should be noted that the two reference light sources in FIG. 4A may be coupled to the input fiber by a single optical combiner (e.g., a 3×1 fiber-optic coupler); or the reference signal and the auxiliary reference signal may be provided by a single reference light source that is capable of providing a plurality of reference signals, coupled to the input fiber by an optical combiner. Alternatively, the multi-wavelength optical signal itself may include one or more spectral components (e.g., one or more service channels in an optical network) that can be used as one or more reference signals. One skilled in the art will know how to implement appropriate reference signals in an optical apparatus according to the present invention, to suit a given application.

In the above embodiments, the diffraction grating 220 may be a ruled diffraction grating, a holographic diffraction grating, an echelle grating, or a dispersing prism, all commonly employed in the art for separating a multi-wavelength signal by wavelength. By way of example, the wavelength-disperser in the aforementioned embodiments is shown to be in the form of a reflective diffraction grating. One skilled in the art will appreciate that a transmission diffraction grating, or a dispersing prism, may be alternatively implemented in an optical apparatus of the present invention. The beam-focuser may additionally be an assembly of focusing lenses, or any other suitable beam-focusing means known in the art. The focusing function may also be provided by using a curved diffraction grating that performs a dual function of wavelength-separating and beam-focusing. It should be noted that in applications where the spectral channels along with the reference spectral component are well separated, the beam-focuser, such as the focusing lens 230 in the above embodiments, might not be utilized.

Moreover, the beam-receiving elements 250-1 through 250-N may be optical power sensors, such as photodiodes in the form of pn photodetectors, pin (p-intrinsic-n) photodetectors, or avalanche photo detectors (APDs). The optical apparatus thus constructed constitutes a spectral power monitor with servo-control capability, providing a characteristic power spectrum of the spectral channels of interest. The beam-receiving elements 250-1 through 250-N may also be micromirrors (e.g., silicon micromachined mirrors), each being individually controllable (e.g., pivotable about one or two axes) to dynamically route the spectral channels according to a predetermined scheme. The beam-receiving elements 250-1 through 250-N may alternatively be an array of optical fibers, into which the spectral channels are directed. The optical apparatus thus constructed constitutes a demultiplexer, or a multiplexer upon reversing the propagation of optical beams. The beam-receiving elements 250-1 through 250-N may additionally be in the form of an array of beam-shaping elements, such as focusing lenses, so as to project the spectral channels at desired locations. The beam-receiving elements 250-1 through 250-N can also be in the form of an array of optical modulators, such as liquid-crystal light modulators or optical attenuators, for modulating one or more characteristics (e.g., amplitude and/or phase) of each spectral channel.

In FIG. 2A, 3A, 3B or 4A, by way of example, the beam-receiving elements are shown to have a one-to-one correspondence with the spectral channels. There might be applications where a subset of beam-receiving elements each corresponds with a plurality of the spectral channels, or a plurality of beam-receiving elements are designated to a single spectral channel. For instance, in the event that optical power sensors are used as the beam-receiving elements, one or more optical power sensors may each be assigned to receive a plurality of the spectral channels, so as to provide an integrated power measurement of the received spectral channels.

It is known that the diffraction efficiency of a diffraction grating is generally polarization-dependent, and that the polarization-dependent effect may become considerable for a grating with a large number of groove lines (per unit length). Thus, in the event that a diffraction grating is used as a wavelength-disperser, as is in the embodiment of FIG. 2A, 3A, 3B or 4A, various means/mechanisms may be utilized to mitigate the associated polarization-sensitive effects. By way of example, a polarization diversity scheme may be implemented. In this scenario, the input multi-wavelength optical signal (along with one or more reference signals) is first decomposed into a P-polarization portion and an S-polarization portion. Assuming that P-polarization is the preferred direction of the diffraction grating (i.e., the diffraction efficiency is higher for P-polarization than for S-polarization), the S-polarization portion is then rotated by 90-degrees, whereby the optical signals incident onto the diffraction grating all possess P-polarization. Such a polarization diversity scheme has the advantage of maximizing the diffraction efficiency. Alternatively, a suitable polarization-sensitive element (e.g., a leaky beam-splitter) may be implemented, serving to attenuate the P-polarization portion relative to the S-polarization portion in the input multi-wavelength optical signal (along with one or more reference signals) according to a predetermined ratio prior to impinging onto the diffraction grating, so as to compensate for the differential treatment in polarization inflicted by the diffraction grating.

Figure 5A:
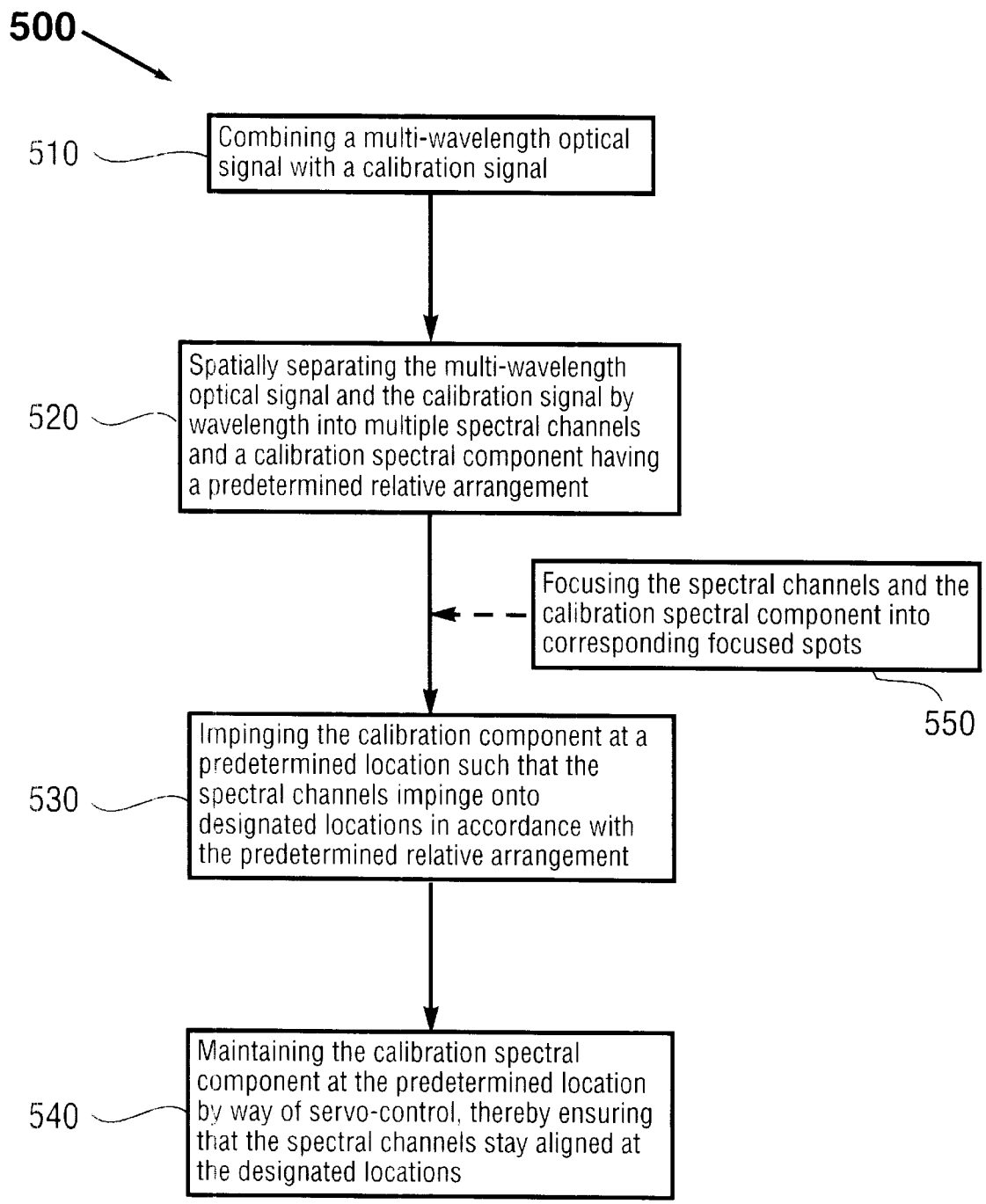
FIGS. 5A–5B show two flowcharts illustrating a method of performing spectral alignment of a multi-wavelength optical signal, according to the present invention.

The present invention further provides a method of spectral alignment of a multi-wavelength optical signal. As a way of example to illustrate the general principles of the present invention, FIG. 5A shows an exemplary flowchart, outlining the method of the present invention. Method 500 entails combining the multi-wavelength optical signal along with a reference (or calibration) signal, as indicated in step 510; spatially separating the multi-wavelength optical signal and the reference (or calibration) signal by wavelength into multiple spectral channels and a reference (or calibration) spectral component having a predetermined relative arrangement, as indicated in step 520; impinging the reference (or calibration) spectral component at a predetermined location, such that the spectral channels impinge onto designated locations in accordance with the predetermined relative arrangement, as indicated in step 530; maintaining the reference (or calibration) spectral component at the predetermined location by way of servo-control and thereby ensuring that the spectral channels stay aligned at the designated locations, as indicated in step 540.

The aforementioned method of the present invention utilizes the fact that the reference spectral component and the spectral channels, each characterized by a distinct center wavelength, form a spectral array with a predetermined relative arrangement. Thus, aligning the reference spectral component at a predetermined location ensures the spectral channels simultaneously impinge onto the designated locations in accordance with the spectral array. This provides a simple and effective way of aligning a spectral array formed by a multi-wavelength optical signal. The thus-aligned spectral channels may then be individually manipulated, for example, by an array of beam-receiving elements, as described above.

Figure 5B:
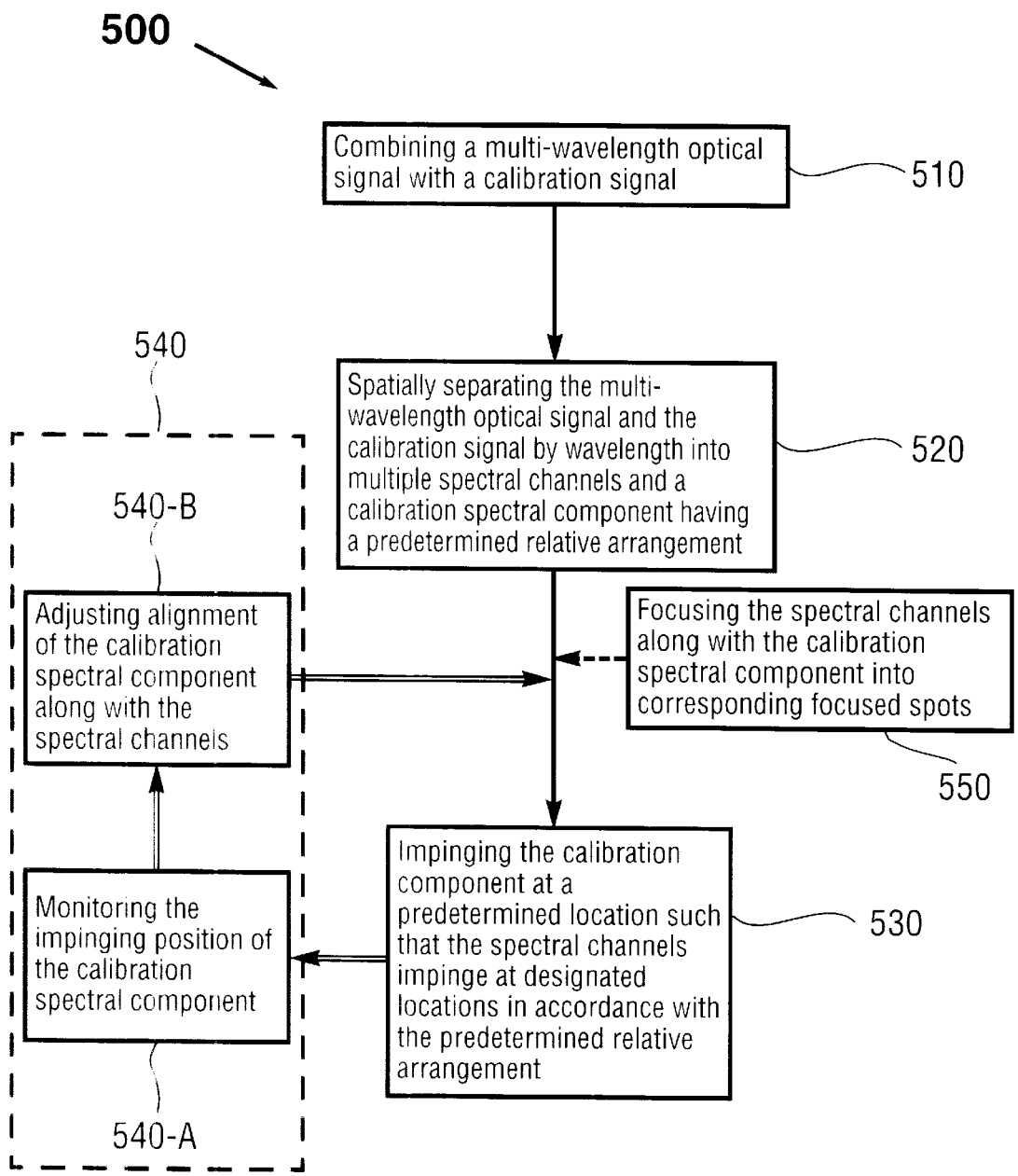

FIG. 5B illustrates in further detail an exemplary embodiment of the servo-control operation recited in the step 540 of FIG. 5A. It entails monitoring the real-time impinging position of the reference (or calibration) spectral component, as indicated in step 540-A; and adjusting the alignment of the reference (or calibration) spectral component along with the spectral channels accordingly, so as to maintain the impinging position of the reference (or calibration) spectral component at the predetermined location and thereby ensure that the spectral channels stay aligned at the designated locations, as recited in step 540-B.

The method 500 of FIG. 5A (or FIG. 5B) may further include the step of focusing the spectral channels along with the reference (or calibration) spectral component into corresponding focused spots, as indicated in step 550. The method 500 of FIG. 5A (or FIG. 5B) may additionally include the step of optically detecting the spectral channels at the designated locations, so as to provide a power spectrum of the detected spectral channels; the step of re-directing the spectral channels, so as to route the spectral channels according to a predetermined scheme; or modulating one or more characteristics of the spectral channels.

Those skilled in the art will recognize that the exemplary embodiments described above provide only a few of many optical systems that can be constructed according to the present invention. Various means and methods can be devised to perform the designated functions in an equivalent manner. Moreover, various changes, substitutions, and alternations can be made herein without departing from the principles and the scope of the invention. As such, a new line of servo-based optical systems, including spectral power monitors and optical multiplexers, can be constructed according to the present invention, to meet the ever challenging demands of optical networking applications.

Although the present invention and its advantages have been described in detail, it should be understood that various changes, substitutions, and alternations can be made herein without departing from the principle and the scope of the invention. Accordingly, the scope of the present invention should be determined by the following claims and their legal equivalents.

What is claimed is:

1. A method of performing spectral alignment of a multi-wavelength optical signal, comprising:
   a) combining said multi-wavelength optical signal with a reference signal;
   b) spatially separating said multi-wavelength optical signal and said reference signal by wavelength into multiple spectral channels and a reference spectral component having a predetermined relative arrangement;
   c) impinging said reference spectral component at a predetermined location, such that said spectral channels impinge onto designated locations in accordance with said predetermined relative arrangement; and
   d) monitoring an impinging position of said reference spectral component and adjusting an alignment of said reference spectral component along with said spectral channels accordingly, so as to maintain said reference spectral component at said predetermined location and thereby ensure that said spectral channels stay aligned at said designated locations.

2. The method of claim 1 further comprising the step of focusing said spectral channels and said reference spectral component into corresponding focused spots.

3. The method of claim 1 further comprising the step of optically detecting said spectral channels at said designated locations.

4. The method of claim 1 further comprising the step of re-directing said spectral channels at said designated locations, so as to dynamically route said spectral channels according to a predetermined scheme.

5. The method of claim 1 further comprising the step of optically coupling said spectral channels at said designated locations into an array of optical fibers.

6. The method of claim 1 further comprising the step of optically modulating said spectral channels at said designated locations.

7. An optical apparatus comprising:
   a) an input port, providing a multi-wavelength optical signal and a reference signal;
   b) a wavelength-disperser, for separating said multi-wavelength optical signal and said reference signal by wavelength into multiple spectral channels and a reference spectral component in a spectral array with a predetermined relative arrangement;
   c) a beam-receiving array including a reference-wavelength-sensing element and a plurality of beam-receiving elements, positioned such to receive corresponding ones of said reference spectral component and said spectral channels; and
   d) a servo-control unit for maintaining said reference spectral component at a predetermined location on said reference-wavelength-sensing element, so as to maintain a particular alignment between said spectral channels and said beam-receiving elements.

8. The optical apparatus of claim 7 wherein said servo-control unit comprises a alignment-adjusting element for adjusting an alignment of said reference spectral component along with said spectral channels, and a processing element in communication with said reference-wavelength-sensing element and said alignment-adjusting element, for monitoring an impinging position of said reference spectral component onto said reference-wavelength-sensing element and providing control of said alignment-adjusting element.

9. The optical apparatus of claim 8 wherein said alignment-adjusting element comprises an actuation device coupled to said beam-receiving array, for causing said reference-wavelength-sensing element and said beam-receiving elements to move in tandem.

10. The optical apparatus of claim 8 wherein said alignment-adjusting element comprises a steering-mirror, in optical communication with said input port and said wavelength-disperser, for adjusting an alignment of said multi-wavelength optical signal along with said reference signal.

11. The optical apparatus of claim 8 wherein said alignment-adjusting element comprises an actuation device coupled to said wavelength-disperser, for causing said wavelength-disperser to rotate.

12. The optical apparatus of claim 7 wherein each beam-receiving element receives one of said spectral channels.

13. The optical apparatus of claim 12 wherein said beam-receiving elements comprise optical power sensors.

14. The optical apparatus of claim 13 wherein said optical power sensors comprise photodiodes.

15. The optical apparatus of claim 12 wherein said beam-receiving elements comprise micromirrors.

16. The optical apparatus of claim 15 wherein said micromirrors comprise silicon micromachined mirrors.

17. The optical apparatus of claim 12 wherein said beam-receiving elements comprise optical fibers, into which said spectral channels are directed.

18. The optical apparatus of claim 12 wherein said beam-receiving elements comprise focusing lenses.

19. The optical apparatus of claim 12 wherein said beam-receiving elements comprise optical modulators.

20. The optical apparatus of claim 7 wherein a subset of said beam-receiving elements each receives a plurality of said spectral channels.

21. The optical apparatus of claim 20 wherein said beam-receiving elements comprise optical power sensors.

22. The optical apparatus of claim 20 wherein said beam-receiving elements comprise micromirrors.

23. The optical apparatus of claim 7 wherein said reference-wavelength-sensing element comprises an element selected from the group consisting of position sensitive detectors, split detectors, and quadrant detectors.

24. The optical apparatus of claim 7 wherein said wavelength-disperser comprises an element selected from the group consisting of ruled diffraction gratings, holographic gratings, echelle gratings, curved diffraction gratings, transmission gratings, and dispersing prisms.

25. The optical apparatus of claim 7 wherein said input port comprises a fiber collimator, coupled to an input optical fiber.

26. The optical apparatus of claim 25 further comprising an optical combiner, for coupling a reference light source to said input optical fiber, wherein said input optical fiber transmits said multi-wavelength optical signal and said reference light source provides said reference signal.

27. The optical apparatus of claim 26 wherein said optical combiner comprises a fiber-optic coupler.

28. The optical apparatus of claim 7 further comprising at least one focusing lens, for focusing said spectral channels and said reference spectral component into corresponding focused spots.

29. The optical apparatus of claim 28 wherein said servo-control unit comprises an actuation device coupled to said at least one focusing lens, for causing said at least one focusing lens to move, and a processing element in communication with said reference-wavelength-sensing element and said actuation device, for monitoring an impinging position of said reference spectral component onto said reference-wavelength-sensing element and providing control of said actuation device.

30. The optical apparatus of claim 7 further comprising an auxiliary reference signal in said spectral array and an auxiliary-reference-wavelength-sensing element in said beam-receiving array, wherein said auxiliary reference signal emerges from said input port, along with said multi-wavelength optical signal and said reference signal, and is directed by said wavelength-disperser onto said auxiliary-reference-wavelength-sensing element at a prescribed location.

31. The optical apparatus of claim 30 wherein said servo-control unit further ensures that said auxiliary reference signal stays aligned at said prescribed location on said auxiliary-reference-wavelength-sensing element.

32. The optical apparatus of claim 31 wherein said servo-control unit comprises a first alignment-adjusting element for adjusting a relative alignment between said spectral array and said beam-receiving array, a second alignment-adjusting element for adjusting a pitch of said spectral array, and a processing element in communication with said first and second alignment-adjusting elements, said reference-wavelength-sensing element and said auxiliary-reference-wavelength-sensing element, wherein said processing element monitors impinging positions of said reference spectral component and said auxiliary reference signal onto said reference-wavelength-sensing element and said auxiliary-reference-wavelength-sensing element, respectively, and provides control of said first and second alignment-adjusting elements accordingly, so as to maintain said reference spectral component and said auxiliary reference signal at said predetermined location and said prescribed location respectively.

33. The optical apparatus of claim 32 wherein said first alignment-adjusting element comprises an actuation device coupled to said beam-receiving array, for causing said beam-receiving array to move.

34. The optical apparatus of claim 32 further comprising at least one focusing lens, for focusing said spectral channels along with said reference spectral component and said auxiliary reference signal into corresponding focused spots, wherein said first alignment-adjusting element comprises an actuation device coupled to said at least one focusing lens, for causing said at least one focusing lens to move.

35. The optical apparatus of claim 32 wherein said second alignment-adjusting element comprises a steering-mirror, in optical communication with said input port and said wavelength-disperser, for adjusting an alignment of said multi-wavelength optical signal along with said reference signal and said auxiliary reference signal.

36. The optical apparatus of claim 32 wherein said second alignment-adjusting element comprises an actuation device coupled to said wavelength-disperser, for causing said wavelength-disperser to rotate.

37. The optical apparatus of claim 30 wherein said input port comprises a fiber collimator, coupled to an input optical fiber, wherein said optical apparatus further comprises at least one optical combiner for coupling at least one reference light source to said input optical fiber, and wherein said input optical fiber transmits said multi-wavelength optical signal and said at least one reference light source provides said reference signal and said auxiliary reference signal.

38. The optical apparatus of claim 30 wherein said auxiliary-reference-wavelength-sensing element comprises an element selected from the group consisting of position sensitive detectors, split detectors, and quadrant detectors.

39. An optical apparatus comprising:
   a) an input port, providing a multi-wavelength optical signal and first and second reference signals;
   b) a wavelength-disperser that separates said multi-wavelength optical signal and said first and second reference signals by wavelength into multiple spectral channels and first and second reference spectral components having a predetermined relative arrangement;
   c) a beam-focuser that focuses said spectral channels along with said first and second reference spectral components into corresponding focused spots in a spectral array with said predetermined relative arrangement;
   d) a beam-receiving array, including first and second reference-wavelength-sensing elements and a plurality of beam-receiving elements, positioned such to receive said first and second reference spectral components and said spectral channels respectively; and
   e) a first alignment-adjusting element that adjusts an alignment between said spectral array and said beam-receiving array, so as to enable said first reference spectral component to be aligned at a first predetermined location on said first reference-wavelength-sensing element and said second reference spectral component to be aligned at a second predetermined location on said second reference-wavelength-sensing element.

40. The optical apparatus of claim 39 wherein said first alignment-adjusting element comprises an actuation device coupled to said beam-receiving array, for causing said beam-receiving array to move.

41. The optical apparatus of claim 39 wherein said first alignment-adjusting element comprises an actuation device coupled to said beam-focuser, for causing said beam-focuser to move.

42. The optical apparatus of claim 41 wherein said beam-focuser comprises at least one focusing lens.

43. The optical apparatus of claim 39 further comprising a servo-control unit, including said first alignment-adjusting element and a processing element, wherein said processing element monitors impinging positions of said first and second reference spectral components onto said first and second reference-wavelength-sensing elements respectively, and provides control of said first alignment-adjusting element accordingly, thereby ensuring that said first and seconds reference spectral components stay aligned at said first and second predetermined locations, respectively.

44. The optical apparatus of claim 43 wherein said servo-control unit further comprises a second alignment-adjusting element that adjusts a pitch of said spectral array, said second alignment-adjusting element being in communication with said processing element.

45. The optical apparatus of claim 44 wherein said second alignment-adjusting element comprises a steering mirror, in optical communication with said input port and said wavelength-disperser, for adjusting an alignment of said multi-wavelength optical signal along with said first and second reference signals.

46. The optical apparatus of claim 44 wherein said second alignment-adjusting element comprises an actuation device coupled to said wavelength-disperser, for causing said wavelength-disperser to rotate.

47. The optical apparatus of claim 39 wherein either of said first and second reference-wavelength-sensing elements comprises an element selected from the group consisting of position sensitive detectors, split detectors, and quadrant detectors.

48. The optical apparatus of claim 39 wherein said wavelength-disperser comprises an element selected from the group consisting of ruled diffraction gratings, holographic gratings, echelle gratings, curved diffraction gratings, transmission gratings, and dispersing prisms.

49. The optical apparatus of claim 39 wherein said input port comprises a fiber collimator, coupled to an input optical fiber, wherein said optical apparatus further comprises at least one optical combiner for coupling at least one reference light source to said input optical fiber, and wherein said input optical fiber transmits said multi-wavelength optical signal and said at least one reference light source provides said first and second reference signals.

50. The optical apparatus of claim 39 wherein said beam-receiving elements comprise optical power sensors.

51. The optical apparatus of claim 39 wherein said beam-receiving elements comprise micromirrors.

52. The optical apparatus of claim 39 wherein said beam-receiving elements comprise optical fibers.

* * * * *